July 2, 1968  J. F. STONE  3,391,264
CONTROL SWITCH WITH COMBINED ROTARY AND
NONROTARY ACTUATING MEANS
Filed May 24, 1967  3 Sheets-Sheet 2

INVENTOR:
John Frederick Stone
By:

July 2, 1968

J. F. STONE 3,391,264

CONTROL SWITCH WITH COMBINED ROTARY AND
NONROTARY ACTUATING MEANS

Filed May 24, 1967

United States Patent Office 3,391,264
Patented July 2, 1968

3,391,264
CONTROL SWITCH WITH COMBINED ROTARY AND NONROTARY ACTUATING MEANS
John F. Stone, London, England, assignor to Elliott Brothers (London) Limited, London, England, a British company
Filed May 24, 1967, Ser. No. 640,976
Claims priority, application Great Britain, May 24, 1966, 23,204/66; May 27, 1966, 24,044/66
8 Claims. (Cl. 200—167)

ABSTRACT OF THE DISCLOSURE

Electrical control apparatus is disclosed which comprises a potentiometer or potential divider operated by a rotary ring-shaped actuating member, and an electrical switch whose operating dolly protrudes through the aperture in the ring-shaped member. The apparatus may be internally illuminated, and the operating dolly co-operates with the periphery of the aperture in the ring-shaped member to control the light passing out through the aperture according to the position of the operating dolly.

---

The invention relates to apparatus for controlling variables and, in particular, for switching and/or otherwise controlling electrical parameters.

According to the invention, there is provided control apparatus, comprising first actuating means having an aperture therein and rotatable about an axis passing through said aperture for operating first control means for varying a parameter, and second actuating means extending into said aperture and movable to and fro in a substantially straight line for operating second control means for varying a parameter.

According to the invention, there is further provided electrical control apparatus, comprising a rotary actuating member having an aperture therein and mounted so as to be rotatable about an axis passing through said aperture, rotary electrical control means connected to be operated by rotation of said rotary actuating member, and an electrical switch having a non-rotary actuating member extending into said aperture, said non-rotary actuating member being movable to and fro for operating said electrical switch.

Figure 1:
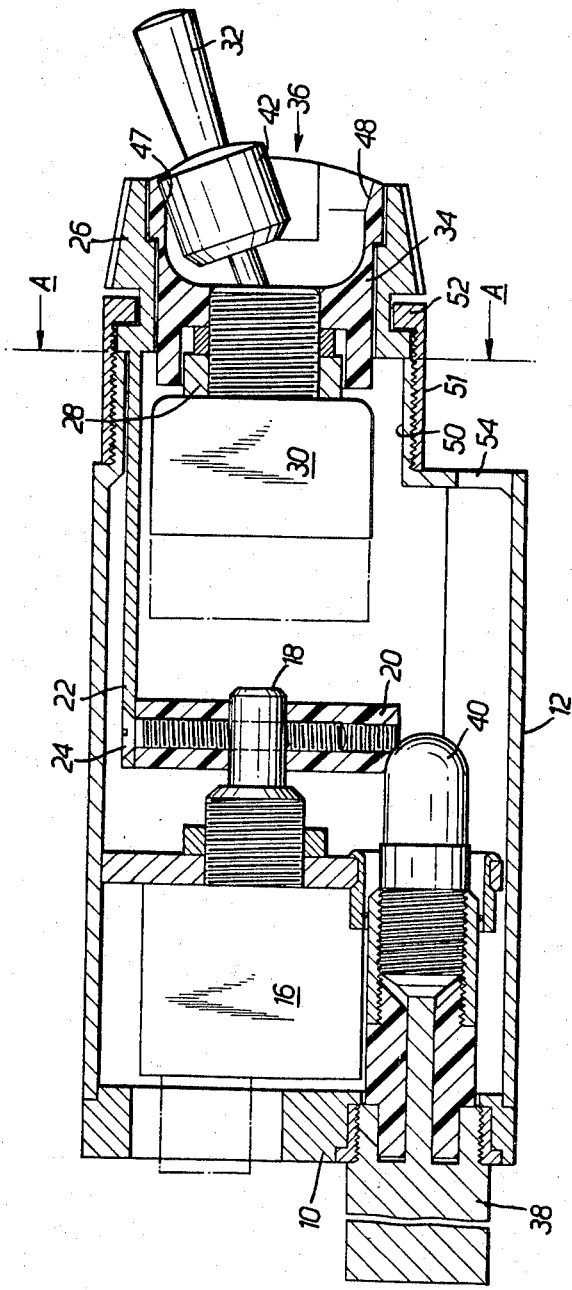
Figure 2:
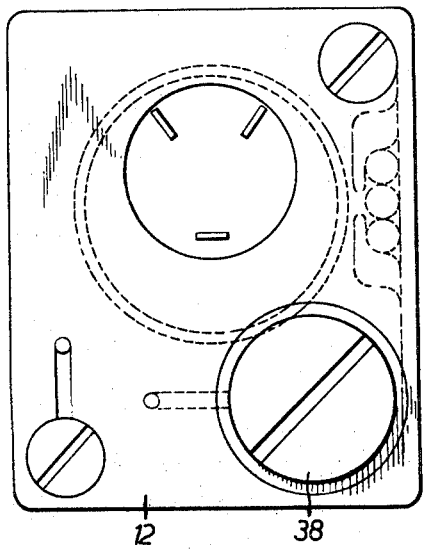
Figure 3:
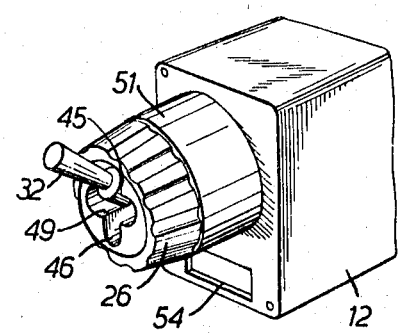
Figure 4:
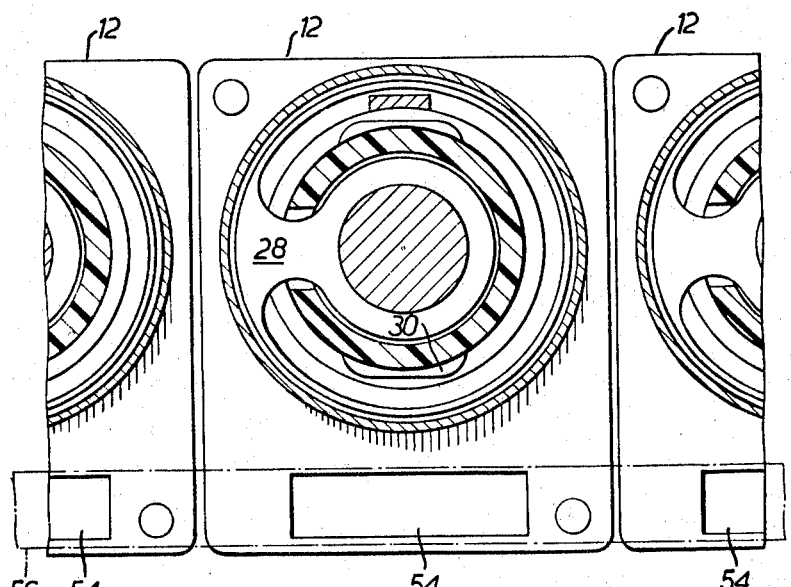
Figure 5:
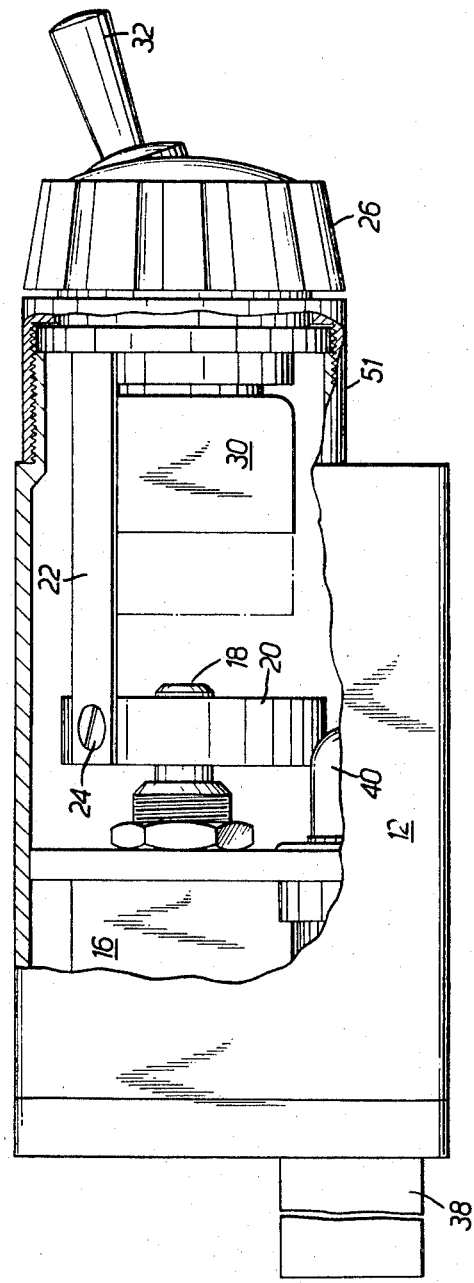

Electrical control apparatus embodying the invention will now be described by way of example and with reference to the accompanying drawings in which:

FIGURE 1 is a cross section of the apparatus in side elevation;
FIGURE 2 is a rear view of the apparatus;
FIGURE 3 is a front view of the apparatus;
FIGURE 4 is a section on line A—A of FIGURE 1 and also shows further apparatus similar to that shown in FIGURE 1; and
FIGURE 5 is a side elevation of the apparatus with part of its casing cut away.

The apparatus has a base 10 and an outer casing 12 which is generally box-shaped. Inside the casing 12 is mounted a unit 16, such as a potentiometer or potential divider, having a resistance element and a slider movable thereover by a rotatable operating shaft 18 on which is supported a disc 20. An arm 22, of narrow width, is clamped to the periphery of the disc 20 by a screw 24 which also passes through the rotary shaft 18, thereby clamping the disc 20 to the shaft. FIGURE 5 shows the shaft 18 rotated slightly as compared with FIGURE 1, and illustrates the arm 22 more clearly. The arm 22 extends to the front of the apparatus and terminates in a knurled tubular member 26 which is thus rotatable manually from the front of the apparatus to turn the disc 20 and thus the shaft 18. In this way, the setting of the unit 16 is varied. The range of possible movement of the shaft 18 is less than 360 degrees; in one example, it is approximately 300 degrees. Therefore, the arm 22 moves through 300° of a circular path and a bracket 28 is cantilevered from the side of the casing 12 to extend through the remaining portion of the circular path to support a switch 30 having an operating dolly 32 which extends through the aperture defined by the circular member 26.

Therefore, the apparatus described permits two separate electrical control means (the unit 16 and the switch 30) to be separately controlled, and yet has a very small size and, in particular, a very small frontal area, making it particularly, but not exclusively, suitable for use in restricted-space environments such as in aircraft.

The unit 16 need not comprise a resistance element and slider, but may comprise any other rotatable electrical control means such as a rotary switch, or a rotary variable capacitor, for example. The switch 30 may be arranged to be operated by a push-button, for example, instead of the dolly 32, the push-button protruding through the aperture in the member 26 and being movable to and fro parallel to the axis of the shaft 18.

The apparatus may be provided with a transparent moulded member 34 which is fixedly mounted within the aperture defined by the circular member 26. The moulded member 34 defines a frontwards-projecting recess 36 in which the switch dolly 32 is movable. A removable subassembly 38 supports an electric lamp 40 which projects light forward towards the moulded member 34 through which the light can pass so as to be visible from the front of the apparatus. The dolly 32 carries an enlarged opaque portion 42 which is of such size and shape, as compared with the recess 36 that, in the position shown in FIGURE 1, light passing through the moulded member 34 is only visible in a lower segment 46 (FIGURE 3) of the recess 36. When the dolly 32 is moved to the opposite position its enlarged portion 42 cuts off the light passing through the lower segment 46 of the recess 36 and permits it to pass out through the upper segment 45. The upper and lower segments 45 and 46 may be coloured differently so that the colour of light passing through the moulded member 34 differs according to the position of the dolly 32. If desired, one or other of the segments 45 and 46 may be rendered opaque whereby no light is emitted through the moulded member 34 when the switch is in one position. The disc 20 is preferably transparent, and the inside of the casing 12 is made light-reflecting, whereby to increase the amount of light projected forward by the lamp 40. The portion 42 of the dolly 32 is arranged to engage a chamfered portion 47 or 48 (FIGURE 1) according to its position, so as to cut off substantially completely the light passing through the segment in which it is positioned. A central portion 49 (FIGURE 3) of the recess 36 is rendered opaque to prevent it emitting any light.

In the case where the switch dolly 32 is replaced by a push-button for operating the switch 30, the push-button may be arranged to alter the light emitted from the front of the apparatus as it is moved between its two positions. The push-button may, for example, carry a light-obscuring member which, when the push-button is in its outward, released, position is so positioned as to prevent light being emitted from the front of the apparatus, but, when the push-button is pressed inwardly, permits light to be so emitted.

FIGURE 1 shows that the casing 12 has a forward extension 50 which is externally threaded to receive a tubular collar 51 having a front inward-facing lip 52 which rotatably locates the knurled tubular member 26. The casing 12 is arranged to define a forward-facing slot 54 below the extension 50 which may carry an opaque plate supporting a transparent legend which is thus rendered visible by the light produced by the lamp 40. If desired, a plurality of apparatuses, each as described, may be mounted side by side, as indicated diagrammatically in FIGURE 4, so that their respective slots 54 are arranged in line. In such an arrangement, each apparatus can be used to control a different function in an electrical system and, in such a case, the function being controlled by each apparatus can be indicated by the particular legend displayed in its slot 54. A longitudinal strip 56 (shown in dotted form in FIGURE 4) of, for example, Perspex, may be mounted across all the side-by-side mounted apparatuses so as to extend across, and cover, all the slots 54. The front surface of the Perspex strip can be rendered opaque except for transparent legends respectively positioned in front of the slots 54, and the remaining surfaces of the strip, except for the rear surface directly in front of the slot 54, can also be rendered opaque. In this way, each legend is rendered visible by the light shining through the slot behind it. In addition, some of the light emitted by each slot 54 is conducted sideways longitudinally along the Perspex strip 56 and helped to illuminate the legends in front of the adjacent slots. In such an arrangement, therefore, all the legends appear to be substantially equally illuminated, in contrast to arrangements in which a row of legends is illuminated from a central position so that the legends at the end of the row appear dim. Should one of the lamps 40 fail, this is immediately apparent to an observer since the appropriate legend will appear to be noticeably dimmer than the rest; however, the light conducted along the Perspex strip from the adjacent slots prevents the legend in front of the failed lamp from being completely unilluminated and this may be an important safety factor.

What is claimed is:
1. Control apparatus comprising
a base,
rotary actuating means having an aperture therein and mounted on said base for rotation about an axis passing through the said aperture,
first control means,
connecting means connecting said rotary actuating means to said first control means for operating said first control means to vary a parameter,
a toggle-type electrical switch mounted on said base, and
an operating dolly for the switch connected to operate said toggle-type electrical switch for varying a parameter, said operating dolly extending into said aperture and being movable to and fro between at least two positions on a line transverse to the said axis.

2. Control apparatus according to claim 1, in which said first control means is a rotary electrical control means.

3. Apparatus according to claim 1, in which the said connecting means comprises a connection member positioned eccentrically of said axis and extending between said rotary actuating means and said first control means whereby to move along a circular path centered on said axis as the rotary actuating member rotates.

4. Apparatus according to claim 3, including means limiting the range of possible movement of said connection member to a predetermined portion of said circular path less than 360 angular degrees, and including support means mounted on said base and supporting the said toggle-type electrical switch, the support means extending transverse to said path and passing through the remaining portion thereof.

5. Apparatus according to claim 1, including light source means mounted on said base and operative to direct light towards the said aperture, and means mounted to be movable with said operating dolly and operative to control the light passing through said aperture.

6. Apparatus according to claim 1, including light source means mounted on said base arranged to direct light towards the said aperture, and means on said operating dolly co-operating with the periphery of the said aperture whereby to provide a first light path allowing light to pass through the aperture when the operating dolly is in one of its said positions and to shut off said first light path when in another of its said positions.

7. Apparatus according to claim 6, in which the said means on the operating dolly co-operates with the periphery of the aperture to provide a second light path when the operating dolly is in the said other position and to shut off said second light path when the operating dolly is in the said one position.

8. An assembly comprising a plurality of apparatuses each according to claim 5, and each including means on said base thereof defining a window arranged to allow passage of light from the light source means of the apparatus, the assembly including a light conducting member mounted on the bases of all the said apparatuses to cover all the said windows and carrying a plurality of legends each positions in front of a respective said window whereby to be illuminated by the light passing through the window, the light conducting member conducting light from each said window towards an adjacent window for at least partially illuminating the said legend in front of the adjacent window.

References Cited

UNITED STATES PATENTS 1,748,015    2/1930    Douglas _____ 200—4
3,320,394    5/1967    Verneau _____ 200—167

ROBERT K. SCHAEFER, *Primary Examiner.*

H. O. JONES, *Assistant Examiner.*